(12) United States Patent
Sugimoto et al.

(10) Patent No.: US 12,292,392 B2
(45) Date of Patent: May 6, 2025

(54) X-RAY INSPECTION APPARATUS AND ARTICLE HANDLING SYSTEM

(71) Applicant: ISHIDA CO., LTD., Kyoto (JP)

(72) Inventors: Kazuyuki Sugimoto, Ritto (JP); Momoko Fujioka, Ritto (JP); Yoshiaki Sakagami, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 195 days.

(21) Appl. No.: 18/174,622

(22) Filed: Feb. 25, 2023

(65) Prior Publication Data

US 2023/0288347 A1   Sep. 14, 2023

(30) Foreign Application Priority Data

Mar. 8, 2022   (JP) ................................ 2022-035330

(51) Int. Cl.
*G01N 23/04*   (2018.01)
*B65G 43/08*   (2006.01)
*G01N 23/083*  (2018.01)

(52) U.S. Cl.
CPC ............. *G01N 23/04* (2013.01); *B65G 43/08* (2013.01); *G01N 23/083* (2013.01); *G01N 2223/643* (2013.01)

(58) Field of Classification Search
CPC .................. G01N 23/04; G01N 23/083; G01N 2223/643; B65G 43/08
See application file for complete search history.

(56) References Cited

U.S. PATENT DOCUMENTS

2019/0297717 A1   9/2019  Kondo
2020/0041423 A1*  2/2020  Sugimoto .............. G01N 23/04

FOREIGN PATENT DOCUMENTS

| CN | 115980098 A   * | 4/2023 | ........... G06T 7/0008 |
|---|---|---|---|
| EP | 3940375 A1   * | 1/2022 | ............. G01G 9/005 |
| JP | 2020-038170 A | 3/2020 | |
| WO | WO-2019159440 A1 * | 8/2019 | ............. G01N 23/04 |
| WO | 2020/050374 A1 | 3/2020 | |
| WO | 2020/184633 A1 | 9/2020 | |

OTHER PUBLICATIONS

Extended Search Report in the corresponding European Patent Application No. 23160144.4 dated Jul. 10, 2023.

* cited by examiner

*Primary Examiner* — David P Porta
*Assistant Examiner* — Fani Polyzos Boosalis
(74) *Attorney, Agent, or Firm* — Global IP Counselors, LLP

(57) ABSTRACT

An X-ray inspection apparatus includes a conveyance unit configured to convey articles, an X-ray irradiation unit configured to irradiate the articles conveyed by the conveyance unit with X-rays, an X-ray detection unit configured to detect X-rays transmitted through the articles, an image generation unit configured to generate an X-ray transmission image based on a detection result by the X-ray detection unit, and a calculation unit configured to calculate, based on the X-ray transmission image, the total amount of the articles conveyed per predetermined time by the conveyance unit.

8 Claims, 6 Drawing Sheets

X-RAY INSPECTION APPARATUS AND ARTICLE HANDLING SYSTEM

TECHNICAL FIELD

One aspect of the present disclosure relates to an X-ray inspection apparatus and an article handling system.

BACKGROUND

For example, Japanese Unexamined Patent Publication No. 2020-38170 describes a production line for goods that consists of a plurality of article handling apparatuses. In such a production line for manufacturing goods, provided may be a conveyance path to convey raw materials and the like that are in a stage prior to being packed in bags or processed.

SUMMARY

In such a production line, if raw materials greater than an assumed amount are conveyed, a problem such as a decrease in inspection accuracy by an inspection apparatus in the downstream process due to a greater overlap of raw materials, or a failure of proper processing due to raw materials exceeding the processing capacity occurs. Meanwhile, if raw materials less than the assumed amount are conveyed, a problem such as a reduction in manufacturing capacity occurs. Thus, workers managing the production line have a desire to properly adjust the amount of raw materials flowing in the conveyance path.

Therefore, an object of one aspect of the present disclosure is to provide an X-ray inspection apparatus and an article handling system capable of providing the worker with information on whether the amount of raw materials being conveyed in the conveyance path is appropriate.

An X-ray inspection apparatus according to one aspect of the present disclosure includes a conveyance unit configured to convey articles; an X-ray irradiation unit configured to irradiate the articles conveyed by the conveyance unit with X-rays; an X-ray detection unit configured to detect X-rays transmitted through the articles; an image generation unit configured to generate an X-ray transmission image based on a detection result by the X-ray detection unit; and a calculation unit configured to calculate, based on the X-ray transmission image, a total amount of the articles conveyed per predetermined time by the conveyance unit.

In this configuration, the total amount of the articles conveyed per predetermined time by the conveyance unit is calculated based on the X-ray transmission image. That is, the X-ray inspection apparatus can provide the worker with information on whether the amount of raw materials conveyed from the X-ray inspection apparatus to the downstream process (in other words, the amount of raw materials supplied from the upstream process to the X-ray inspection apparatus) is appropriate. As a result, the worker who acquired the calculated total amount can adjust the article handling apparatus in the upstream process so that the conveyance amount is appropriate, for example.

The X-ray inspection apparatus in one aspect of the present disclosure may further include a display unit configured to display the total amount, and the calculation unit may cause the display unit to display a warning indication when the above-described total amount falls outside a first predetermined range having a range from a first upper limit value to a first lower limit value, both values being stored in advance. In this configuration, it is possible to explicitly indicate to the worker that the amount of raw materials being conveyed is inappropriate.

In the X-ray inspection apparatus according to one aspect of the present disclosure, when the total amount falls outside a second predetermined range having a range from a second upper limit value to a second lower limit value, both values being stored in advance, the second upper limit value being greater in value than the first upper limit value, the second lower limit value being smaller in value than the first lower limit value, the calculation unit may cause an article handling apparatus provided upstream and/or downstream of the X-ray inspection apparatus and configured to perform processing on the articles to perform error processing. In this configuration, the necessary processing is automatically performed without the need for the worker to acquire the total amount calculated by the calculation unit and perform any action on the article handling apparatus. This makes it possible to reduce the burden on the worker.

An article handling system according to one aspect of the present disclosure includes the above-described X-ray inspection apparatus, and an article supply device as one of the article handling apparatuses configured to supply the articles to the X-ray inspection apparatus, and the calculation unit may perform control to change an article supply amount preset in the article supply device when the total amount falls outside the first predetermined range. In this configuration, the necessary processing is automatically performed in the article handling apparatus constituting the article handling system, without the need for the worker to acquire the total amount calculated by the calculation unit and perform any action on the article handling apparatus. This makes it possible to reduce the burden on the worker.

According to one aspect of the present disclosure, it is possible to provide the worker with information on whether the amount of raw materials being conveyed in the conveyance path is appropriate.

DETAILED DESCRIPTION

The following describes one embodiment of the present disclosure with reference to the drawings. In the description of the drawings, identical elements are denoted by the same reference signs, and redundant explanations are omitted.

Figure 1:
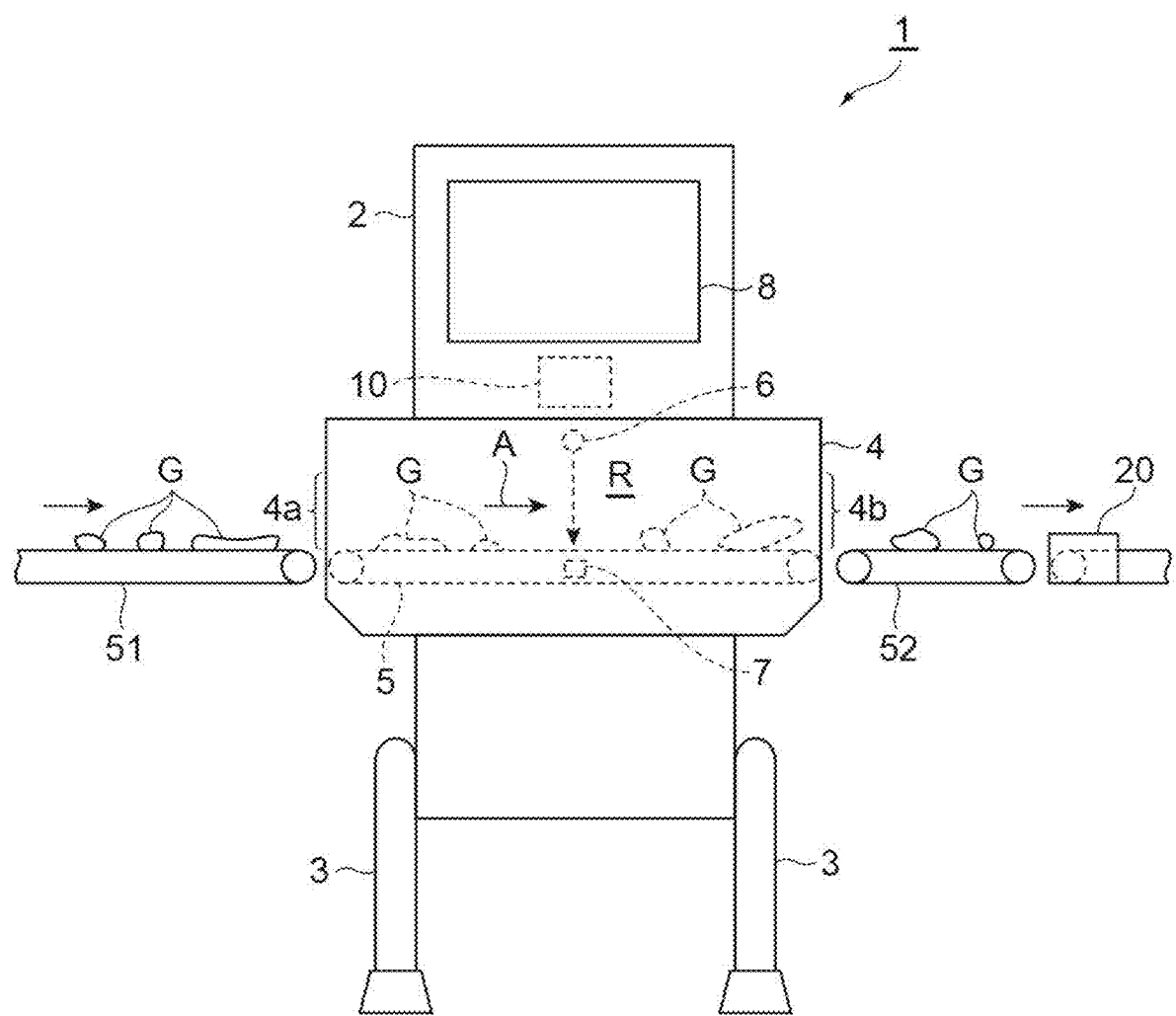
FIG. 1 is a configuration diagram of an X-ray inspection apparatus according to one embodiment.

As illustrated in FIG. 1, an X-ray inspection apparatus 1 has an apparatus body 2, support legs 3, a shield box 4, a conveyance unit 5, an X-ray irradiation unit 6, an X-ray detection unit 7, a display operation unit 8, and a control unit 10. The X-ray inspection apparatus 1 generates an X-ray transmission image of the articles G while conveying the articles G and performs, based on the relevant X-ray transmission image, an inspection of the articles G (for example, a storage number inspection, foreign object inspection, missing item inspection, cracking and chipping inspection, and the like).

The articles G before inspection are carried into the X-ray inspection apparatus 1 by a carry-in conveyor 51. The conveying speed of the carry-in conveyor 51 substantially matches the conveying speed of an article handling apparatus connected upstream. The articles G after inspection are taken out from the X-ray inspection apparatus 1 by a carry-out conveyor 52. The conveying speed of the carry-out conveyor 52 substantially matches the conveying speed of an article handling apparatus connected downstream. The articles G determined to be defective by the X-ray inspection apparatus 1 are sorted out of the production line by a sorting device 20 located downstream of the carry-out conveyor 52. The articles G determined to be good by the X-ray inspection apparatus 1 pass through the relevant sorting device 20 as they are.

The sorting device 20 is a device configured to remove the article G determined to be defective by the inspection performed by the X-ray inspection apparatus 1 from the conveyance path. Examples of sorting devices include arm-type sorting devices using arms, drop-up belt-type sorting devices, pusher-type sorting devices using pusher devices, drop flap-type sorting devices, air jet-type sorting devices, fin-type sorting devices, and the like.

The article G does not have a certain size, shape, or thickness (in other words, having no certain weight) and is what is called a bulk product. Examples of bulk products include dry products such as nuts, dried fruits, dried ingredients, rice crackers, and the like, and wet products such as minced meat, meat, fishery products, frozen foods, agricultural products, and the like. When such bulk products are conveyed by the conveyance unit 5, there may be portions where the articles G overlap each other, or there may be portions where gaps are formed between the adjacent articles G.

The apparatus body 2 houses therein the control unit 10 or the like. The support legs 3 support the apparatus body 2. The shield box 4 is provided in the apparatus body 2. The shield box 4 prevents leakage of X-rays (electromagnetic waves) to the outside. Inside the shield box 4, provided is an inspection area R where the inspection of the articles G by X-rays is performed. In the shield box 4, a carry-in port 4a and a carry-out port 4b are formed. The articles G before inspection are carried into the inspection area R from the carry-in conveyor 51 via the carry-in port 4a. The articles G after inspection are taken out from the inspection area R to the carry-out conveyor 52 via the carry-out port 4b. On each of the carry-in port 4a and the carry-out port 4b, provided is an X-ray shielding curtain (not depicted), which prevents leakage of X-rays.

The conveyance unit 5 is a member configured to convey the articles G and is arranged so as to run through the middle of the shield box 4. The conveyance unit 5 conveys the articles G along the conveying direction A from the carry-in port 4a to the carry-out port 4b via the inspection area R. The conveyance unit 5 is a belt conveyor that is hung between the carry-in port 4a and the carry-out port 4b, for example. The conveyance unit 5, which is a belt conveyor, may be protruded outward from the carry-in port 4a and the carry-out port 4b. The conveying speed of the conveyance unit 5 substantially matches those of the carry-in conveyor 51 and the carry-out conveyor 52.

Figure 2:
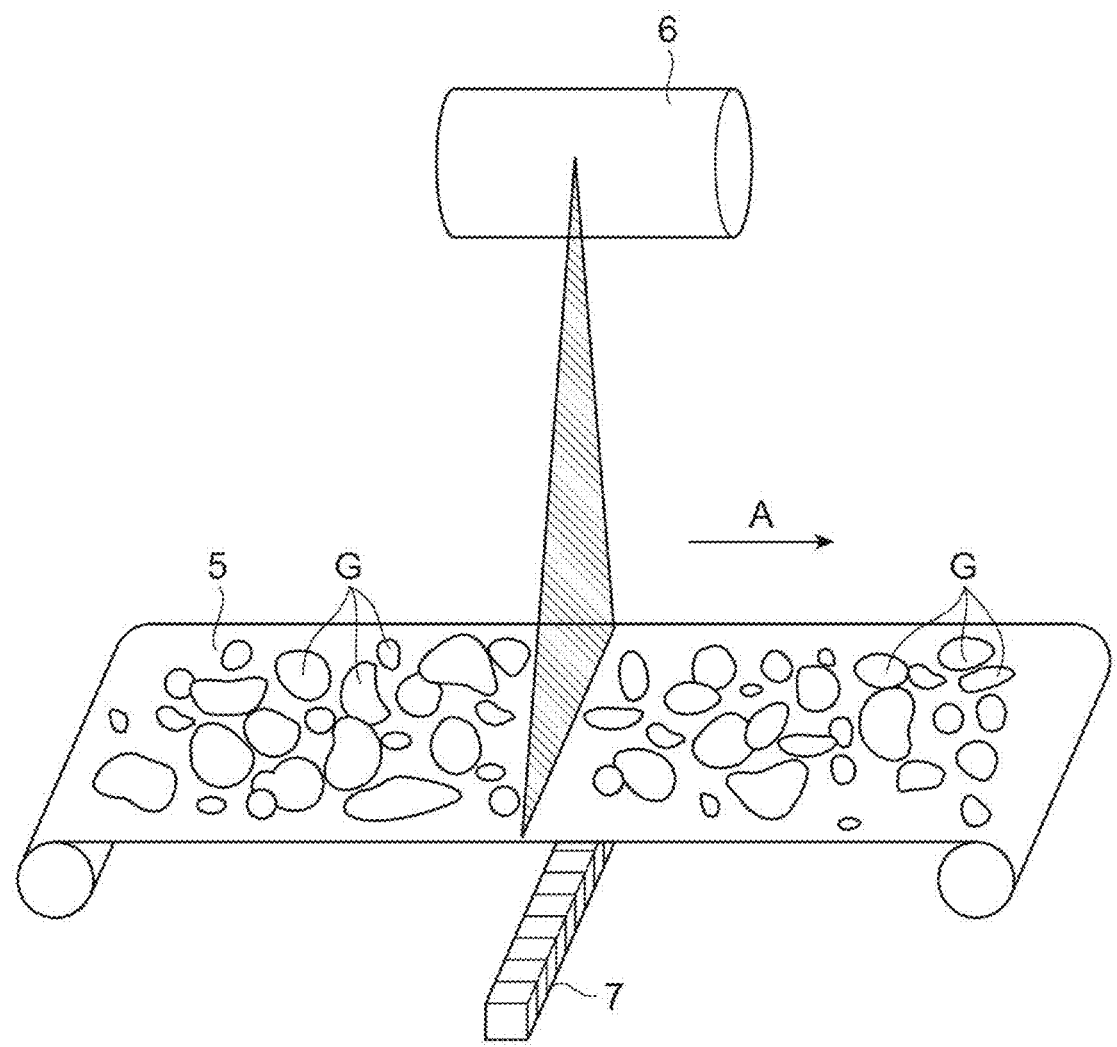
FIG. 2 is a configuration diagram of the inside of a shield box illustrated in FIG. 1.

As illustrated in FIGS. 1 and 2, the X-ray irradiation unit 6 is an electromagnetic-wave irradiation unit (X-ray source) arranged in the shield box 4. The X-ray irradiation unit 6 has an X-ray tube configured to emit X-rays, and an aperture unit configured to spread the X-rays emitted from the X-ray tube in a fan shape in a plane perpendicular to the conveying direction A, for example. The X-rays emitted from the X-ray irradiation unit 6 may include X-rays of various energy bands from low energy (long wavelength) to high energy (short wavelength).

The X-ray detection unit 7 is a sensor member configured to detect electromagnetic waves. The X-ray detection unit 7 is arranged, inside the shield box 4, at a position opposite to the X-ray irradiation unit 6 in the vertical direction. The X-ray detection unit 7 may be capable of detecting X-rays of a specific energy band or may be capable of detecting X-rays in a photon counting method. The X-ray detection unit 7 may be a direct conversion type detector or an indirect conversion type detector. The relevant sensors are lined up in the direction orthogonal to at least the conveying direction and the vertical direction of the conveyance unit 5 (width direction), for example. The relevant elements may be lined up not only in the above-described width direction but also in the above-described conveying direction. That is, the X-ray detection unit 7 may be a line sensor or a group of sensors arranged two-dimensionally. The above-described sensors are photon-detecting sensors such as CdTe semiconductor detectors, for example.

As illustrated in FIG. 1, the display operation unit 8 is provided in the apparatus body 2. The display operation unit 8 displays various information and receives input operations of various conditions from the outside. The display operation unit 8 is a liquid crystal display and displays an operation screen as a touch panel, for example. In this case, an operator can input various conditions via the display operation unit 8.

Figure 3:
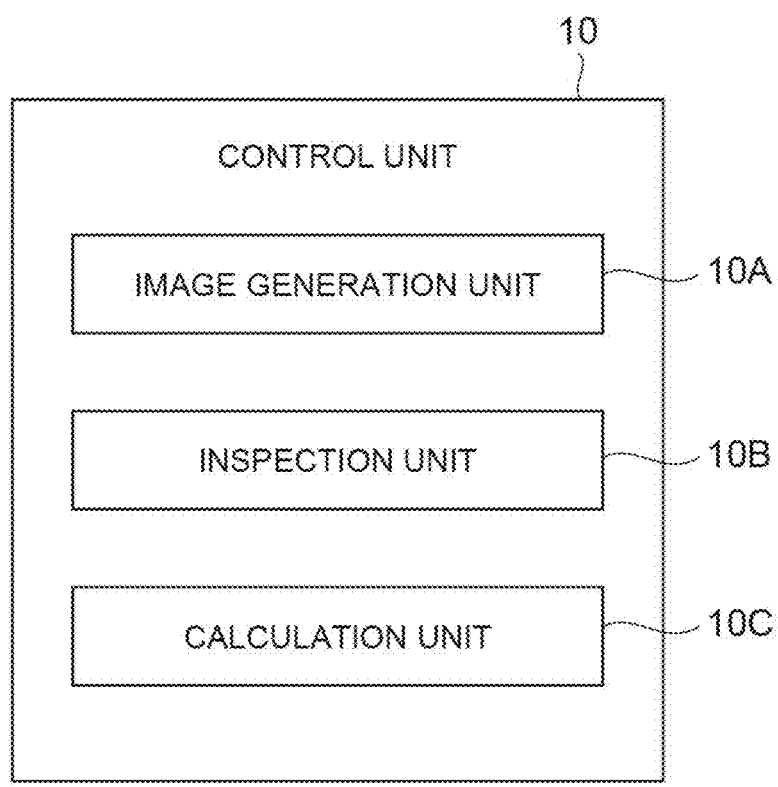
FIG. 3 is a block diagram illustrating a functional configuration of the X-ray inspection apparatus.

The control unit 10 is arranged in the apparatus body 2. The control unit 10 controls the operation of each unit of the X-ray inspection apparatus 1 (in the present embodiment, the conveyance unit 5, the X-ray irradiation unit 6, the X-ray detection unit 7, and the display operation unit 8, and the sorting device 20 arranged downstream of the X-ray inspection apparatus 1). The control unit 10 includes a processor such as a CPU (Central Processing Unit), memory such as a ROM (Read Only Memory) and a RAM (Random Access Memory), and storage such as an SSD (Solid State Drive). The ROM stores therein a program for controlling the X-ray inspection apparatus 1. As illustrated in FIG. 3, the control unit 10 has an image generation unit 10A, an inspection unit 10B, and a calculation unit 10C. In the control unit 10, the image generation unit 10A, the inspection unit 10B, and the calculation unit 10C are configured as software. However, each of these units may be configured as hardware.

Figure 4:
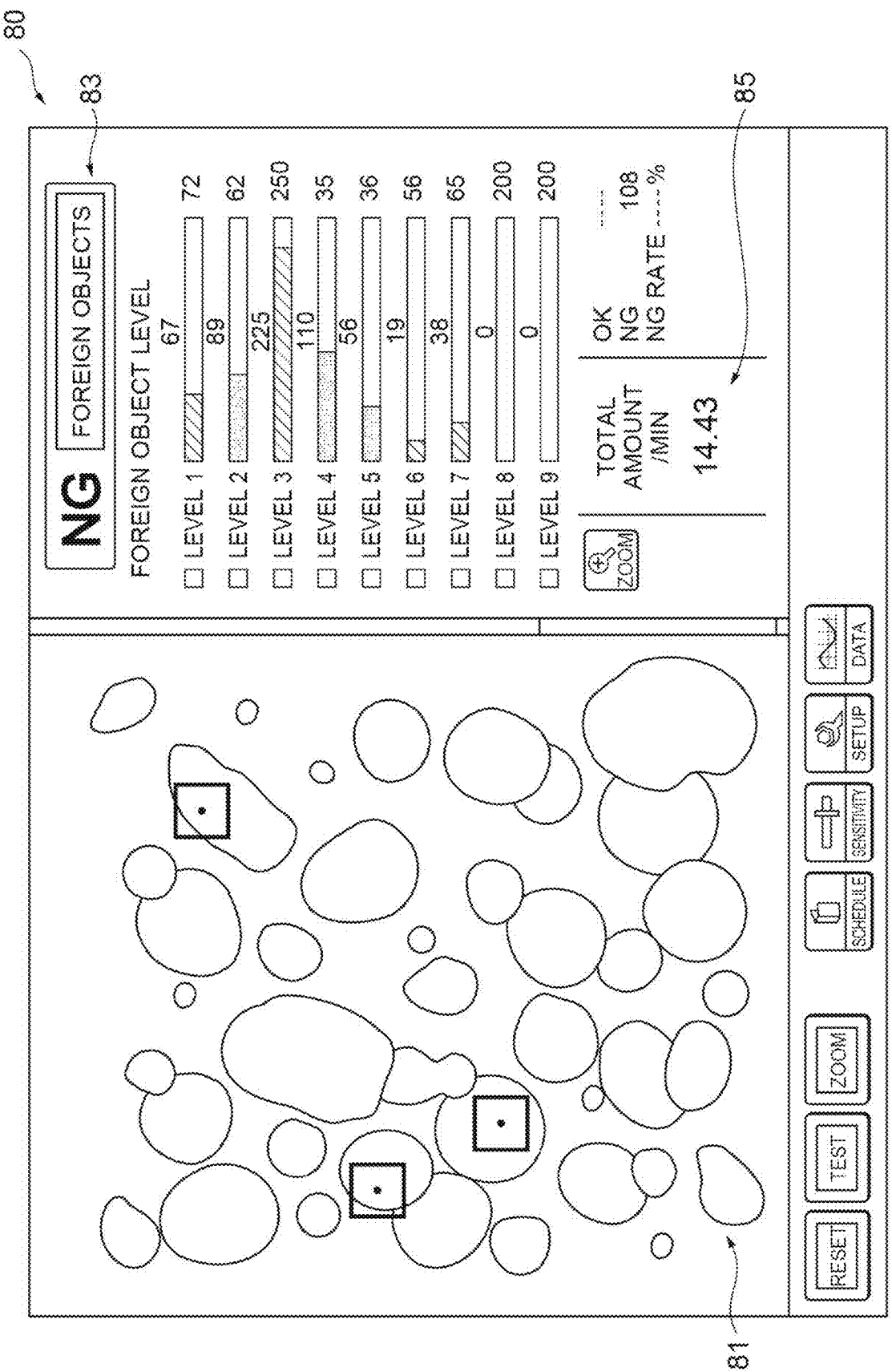
FIG. 4 is one example of an inspection result screen displayed on a display operation unit.

The image generation unit 10A is input with a signal that is output from the X-ray detection unit 7 and is A/D converted. The inspection unit 10B generates an X-ray transmission image of the articles G based on the relevant signal and inspects the articles G based on the relevant X-ray transmission image. The inspection unit 10B inspects the articles G brought into the inspection area R whether a foreign object is contained. When inspecting the articles G of bulk products, as in the present embodiment, the inspection unit 10B performs repeated inspections for each predetermined conveyance area, for example, for a group of articles conveyed in one second. In other words, the inspection unit 10B performs inspection in units of X-ray transmission images of a predetermined length in the conveying direction. The inspection unit 10B causes the display operation unit 8 to display an inspection result screen 80 as illustrated in FIG. 4, for example. The inspection result screen 80 has a foreign-object display portion 81 configured to display the location of the detected foreign object and a result display portion 83 configured to display the inspection results such as OK or NG, for example.

The calculation unit 10C calculates, based on the X-ray transmission image, the total amount of the articles G conveyed per unit time by the conveyance unit 5. In other words, the calculation unit 10C calculates the total amount of the articles G per unit time that pass through the X-ray inspection apparatus 1. Examples of total amount include weight (mass), which can be calculated by the method detailed below, for example. The total amount may be a volume (capacity) that can be calculated based on the weight and density of the article G.

The calculation unit 10C determines article areas in which the articles G are present from the X-ray transmission image of the articles G generated as in the foregoing. The calculation unit 10C estimates the weight of the article G in each article area by applying image processing to the above-described article areas. The relevant weight estimation process is based on the following principle, utilizing the property that thicker materials in the irradiation direction of X-rays appear darker on the X-ray transmission image.

The brightness I of a pixel depicting a material having a thickness t on the X-ray transmission image is expressed by the following Expression 1, where I0 is the brightness of a pixel included in the area where no articles exist.

$$I/I0 = e^{-\mu t} \qquad 1$$

In this case, $\mu$ is a linear absorption coefficient determined by the X-ray energy and the type of material. Solving Expression 1 for the thickness t of material yields the following Expression 2.

$$t = -1/\mu \times \ln(I/I0) \qquad 2$$

The weight of a minute portion of the article G is proportional to the thickness of the relevant minute portion. Therefore, the weight m of the minute portion of the article G represented by a pixel of brightness I can be approximately calculated by the following Expression 3, using the appropriate constant $\alpha$.

$$m = -\alpha \ln(I/I0) \qquad 3$$

The calculation unit 10C estimates the weight of the entire article G by calculating and adding together the weights m corresponding to all the pixels (article areas) constituting the article G.

Next, the method of calculating the total amount (for example, weight or volume) of the articles G conveyed per unit time by the conveyance unit 5 will be explained using the above-described weight estimation method. As in the foregoing, the X-ray inspection apparatus 1 performs repeated inspections for each predetermined conveyance area for each group of articles conveyed in one second, for example, and, in addition, repeatedly estimates the weight for each group of articles conveyed in one second, for example.

Figure 5:
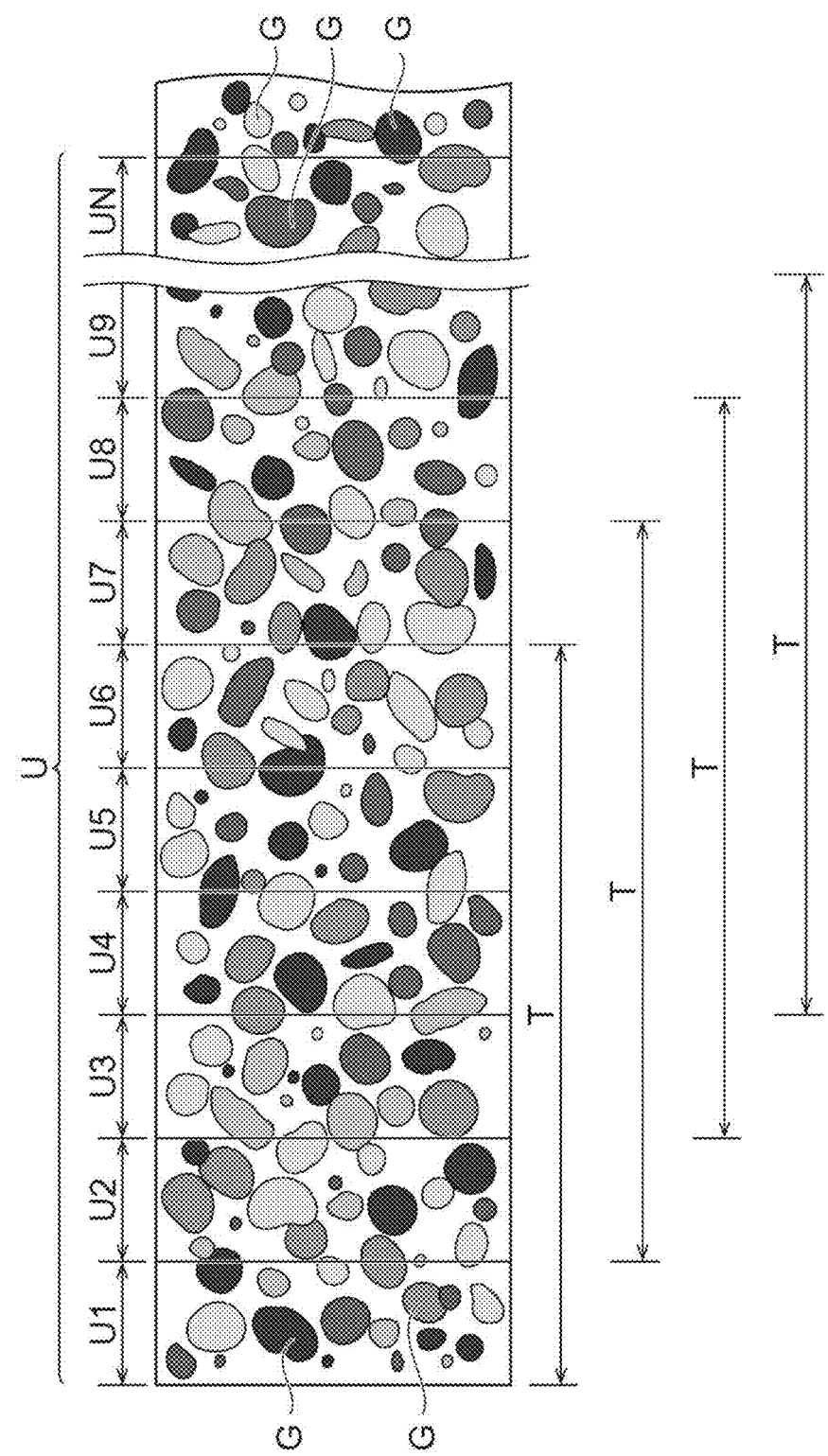
FIG. 5 is a diagram explaining a method of calculating the total amount of articles conveyed per unit time.

FIG. 5 is an X-ray transmission image acquired by continuously capturing the articles G conveyed to the inspection area R, for each second. One image U (U1, U2, . . . , UN) illustrated in FIG. 5 is an image of a group of articles conveyed in one second (hereinafter also referred to as unit image U). The calculation unit 10C adds up weight estimated values obtained from each of six unit images U and calculates the weight estimated value of the articles G conveyed in six seconds (that is, the total amount of the articles G conveyed in six seconds). The calculation unit 10C then multiplies the weight estimated value of the articles G conveyed in six seconds by ten to calculate the weight of the articles G conveyed per minute by the conveyance unit 5 (that is, the total amount of the articles G conveyed per unit time).

In more detail, the calculation unit 10C calculates, based on five X-ray transmission images acquired up to five seconds before the time when a predetermined unit image U was acquired, the total amount of the articles G conveyed per minute. For example, when a unit image U6 is acquired, the total amount of the articles G conveyed per minute is calculated based on six unit images U including the unit image U6 and unit images U1 to U5. Similarly, when a unit image U7 is acquired, the total amount of the articles G conveyed per minute is calculated based on six unit images U, including the unit image U7 and the unit images U2 to U6.

The calculation unit 10C displays, in a display area 85 of the inspection result screen 80 illustrated in FIG. 4, the total amount of the articles G conveyed per minute thus calculated. The total amount of the articles G conveyed per minute displayed in the display area 85 switches for each second. In addition to or in place of displaying the total amount of the articles G conveyed per minute displayed in the display area 85, the calculation unit 10C may display characters representing the excessive amount or insufficient amount that are stored in association with the total amount calculated as in the foregoing. The calculation unit 10C causes the inspection result screen 80 in the display operation unit 8 to display a warning indication when the calculated total amount of the articles G conveyed per minute falls outside a first predetermined range having a range from a first upper limit value to a first lower limit value, both values being stored in advance. The calculation unit 10C may output a warning sound, in addition to or in place of the warning indication.

When the calculated total amount of the articles G per minute falls outside a second predetermined range having a range from a second upper limit value to a second lower limit value, both values being stored in advance, the second upper limit value being greater in value than the first upper limit value, the second lower limit value being smaller in value than the first lower limit value, the calculation unit 10C causes an article handling apparatus provided upstream and/or downstream of the X-ray inspection apparatus 1 and configured to perform processing on the articles G to perform error processing. Examples of error processing include the processes of causing the upstream and/or downstream article handling apparatus to display that the supply amount of the articles G is excessive or insufficient, or causing the upstream article handling apparatus to stop supplying the articles G or to change the supply amount, for example.

The action and effect of the X-ray inspection apparatus 1 in the above-described embodiment will be described. In the X-ray inspection apparatus 1 of the above-described embodiment, the total amount of the articles G conveyed per predetermined time by the conveyance unit 5 is calculated based on X-ray transmission images. The X-ray inspection apparatus 1 can provide the worker with information, via the display operation unit 8, on whether the amount of raw materials conveyed from the X-ray inspection apparatus 1 to the downstream process (in other words, the amount of raw materials supplied to the X-ray inspection apparatus 1 from the upstream process) is appropriate. As a result, the worker who acquired the calculated total amount can adjust the article handling apparatus in the upstream process so that the supply amount is appropriate, for example. Appropriately adjusting the above-described supply amount by the worker can prevent the sorting device 20 from not being able to perform sorting in time or eliminating more articles in a lump when the supply amount is too large, for example. This makes it possible to enhance the sorting accuracy (the probability of correctly sorting defective products as defective products) of the sorting device 20.

In the X-ray inspection apparatus 1 of the above-described embodiment, the calculation unit 10C causes the display operation unit 8 to display the warning indication when the above-described total amount falls outside the first predetermined range having the range from the first upper limit value to the first lower limit value, both values being stored in advance. This makes it possible to explicitly indicate to the worker that the amount of raw materials being conveyed is inappropriate.

In the X-ray inspection apparatus 1 of the above-described embodiment, the calculation unit 10C causes the article handling apparatus provided upstream and/or downstream of the X-ray inspection apparatus 1 to perform error processing when the above-described total amount falls outside the second predetermined range having the range from the second upper limit value to the second lower limit value, both values being stored in advance, the second upper limit value being greater in value than the first upper limit value, the second lower limit value being smaller in value than the first lower limit value. In this configuration, the necessary processing is automatically performed without the need for the worker to acquire the total amount calculated by the calculation unit 10C and perform any action on the article handling apparatus. This makes it possible to reduce the burden on the worker.

Although one embodiment has been described in the foregoing, one aspect of the present disclosure is not limited to the above-described embodiment. Various changes are possible without departing from the spirit of the disclosure.

First Modification

Figure 6:
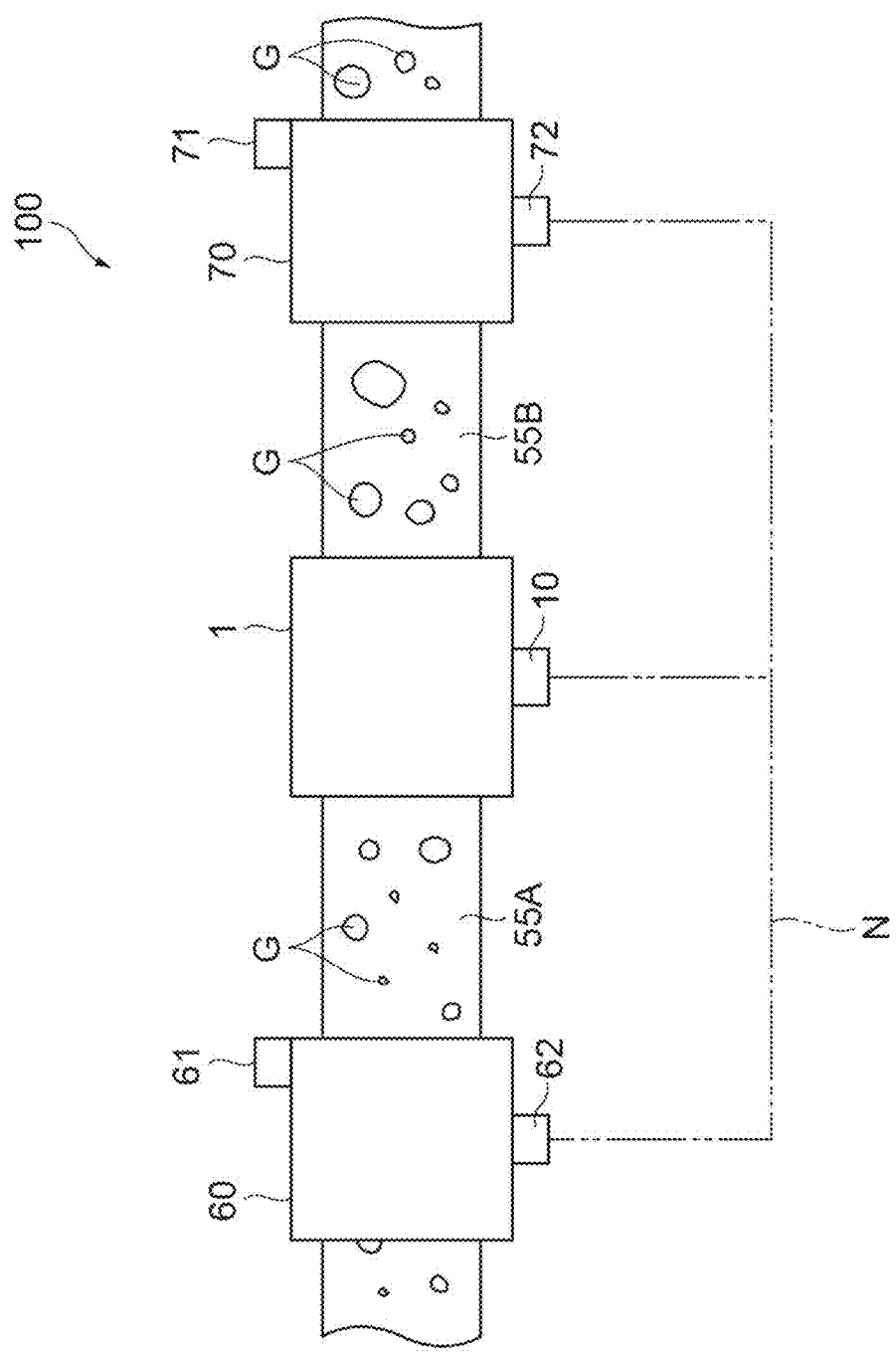
FIG. 6 is a configuration diagram of an article handling system according to a first modification.

The following describes a first modification of the present disclosure. As illustrated in FIG. 6, the first modification of the present disclosure can be configured as an article handling system 100 used in a frozen-food production line, for example, including the above-described X-ray inspection apparatus 1, a first article handling apparatus (article supply device) 60 provided upstream of the X-ray inspection apparatus 1, a second article handling apparatus 70 provided downstream of the X-ray inspection apparatus 1, a conveyance device 55A provided between the first article handling apparatus 60 and the X-ray inspection apparatus 1, and a conveyance device 55B provided between the X-ray inspection apparatus 1 and the second article handling apparatus 70.

An example of the first article handling apparatus 60 is a food processing device. For example, the articles G that are foods before refrigeration to be frozen foods are produced and supplied to the downstream process. An example of the second article handling apparatus 70 is a refrigeration processing device. The second article handling apparatus 70 performs the refrigeration process on the articles G conveyed from the upstream process. Downstream of the second article handling apparatus 70, various inspection apparatuses, a packaging device, a boxing device, and the like that are not depicted are arranged. In such an article handling system 100, the X-ray inspection apparatus 1 inspects the articles G conveyed (supplied) from the first article handling apparatus 60 in the upstream process for the presence of foreign objects and calculates the total amount of the articles G supplied from the first article handling apparatus 60. The inspection for foreign objects in the X-ray inspection apparatus 1 and the method of calculating the total amount are the same as those of the above-described embodiment and thus, are not explained here.

The X-ray inspection apparatus 1, the first article handling apparatus 60, and the second article handling apparatus 70 are provided to be capable of communicating with each other via a network N such as a wired or wireless network. The calculation unit 10C of the X-ray inspection apparatus 1 causes the first article handling apparatus 60 and the second article handling apparatus 70 to perform error processing when the calculated total amount of the articles G per minute falls outside the first predetermined range having the range from the first upper limit value to the first lower limit value, both values being stored in advance, and when it falls outside the second predetermined range having the range from the second upper limit value to the second lower limit value, the second upper limit value being greater in value than the first upper limit value, the second lower limit value being smaller in value than the first lower limit value.

Specifically, when the calculated total amount of the articles G per minute falls outside the first predetermined range, the calculation unit 10C performs control to turn on a warning lamp 61 provided in the first article handling apparatus 60 via a control unit 62 of the first article handling apparatus 60 connected in the network N, and when the calculated total amount of the articles G per minute falls outside the second predetermined range, control to change the supply amount of the articles G, which are foods before freezing, preset to the first article handling apparatus 60 via the control unit 62 of the first article handling apparatus 60 connected in the network N. The calculation unit 10C may have no need to carry out the control as in the foregoing when the total amount falls outside the second predetermined range. In the relevant first modification also, the calculation unit 10C causes the inspection result screen 80 of the display operation unit 8 to display a warning indication when the calculated total amount of the articles G per minute falls outside the first predetermined range.

When the calculated total amount of the articles G per minute falls outside the first predetermined range, the calculation unit 10C causes a warning lamp 71 provided in the second article handling apparatus 70 to turn on via a control unit 72 of the second article handling apparatus 70 connected in the network N, and when the calculated total amount of the articles G per minute falls outside the second predetermined range, causes the second article handling apparatus 70 to stop the operation via the control unit 72 of the second article handling apparatus 70 connected in the network N. The calculation unit 10C may have no need to carry out the control as in the foregoing when the total amount falls outside the second predetermined range.

In such a configuration according to the first modification, even if the worker does not acquire the total amount calculated by the calculation unit 10C and perform any action on the first article handling apparatus 60 and the second article handling apparatus 70, the necessary processing is automatically performed in the first article handling apparatus 60 and the second article handling apparatus 70 constituting the article handling system 100. This makes it possible to reduce the burden on the worker.

As in the foregoing, the first article handling apparatus 60 being controlled by the calculation unit 10C improves the inspection accuracy in the X-ray inspection apparatus 1 as the total amount of the articles G suitable for inspection is supplied to the X-ray inspection apparatus 1. In addition, because the second article handling apparatus 70 is supplied with the total amount of the articles G suitable for refrigeration processing, the number of the articles G that are defective in freezing is reduced and a yield rate is improved.

As a further variation of the above-described first modification, when the calculated total amount of the articles G per minute falls outside the first predetermined range, the calculation unit 10C may perform control to change the supply amount of the articles G, which are foods before freezing, preset to the first article handling apparatus 60 via the control unit 62 of the first article handling apparatus 60 connected in the network N, and cause the second article handling apparatus 70 to stop the operation via the control unit 72 of the second article handling apparatus 70 connected in the network N.

Other Modifications

In the above-described first modification, the refrigeration processing device has been exemplified as the second article handling apparatus 70 arranged downstream of the X-ray inspection apparatus 1 and connected to the calculation unit 10C of the X-ray inspection apparatus 1, but it may be a combination weighing apparatus, and a various inspection apparatus and the like, for example. Even in this case, the calculation unit 10C may control the combination weighing apparatus, the various inspection apparatus and the like, as appropriate, when the calculated total amount of the articles G per minute falls outside the above-described first predetermined range or the second predetermined range.

Instead of the first article handling apparatus 60 in the above-described modification, a first area in which people work may be provided in the area where the first article handling apparatus 60 is arranged and a second area in which people work may be provided in the area where the second article handling apparatus 70 is arranged. In this case, the worker can, by monitoring the total amount of the articles G displayed on the display operation unit 8 of the X-ray inspection apparatus 1 while monitoring the inspection results of the articles G inspected by the X-ray inspection apparatus 1, assign personnel to the first area so that the supply amount to the second area is an appropriate total amount.

In the above-described embodiment and the modifications, it has been exemplified that the calculation unit 10C of the X-ray inspection apparatus 1 controls the first article handling apparatus 60 and/or the second article handling apparatus 70, but a control device configured as a separate unit from the X-ray inspection apparatus 1 may control the first article handling apparatus 60 and/or the second article handling apparatus 70.

What is claimed is:

1. An X-ray inspection apparatus comprising:
   a conveyance unit configured to convey articles, each of which being a bulk product that does not have a certain size, shape or thickness;
   an X-ray irradiation unit configured to irradiate the articles conveyed by the conveyance unit with X-rays;
   an X-ray detection unit configured to detect X-rays transmitted through the articles;
   an image generation unit configured to generate an X-ray transmission image based on a detection result by the X-ray detection unit; and
   a calculation unit configured to calculate, based on the X-ray transmission image, a total amount of articles conveyed per predetermined time by the conveyance unit.

2. The X-ray inspection apparatus according to claim 1 further comprising:
   a display unit configured to display the total amount, wherein
   the calculation unit causes the display unit to display a warning indication when the total amount falls outside a first predetermined range having a range from a first upper limit value to a first lower limit value, both values being stored in advance.

3. The X-ray inspection apparatus according to claim 2, wherein the calculation unit causes an article handling apparatus provided upstream and/or downstream of the X-ray inspection apparatus and configured to process the articles to perform error processing when the total amount falls outside a second predetermined range having a range from a second upper limit value to a second lower limit value, both values being stored in advance, the second upper limit value being greater in value than the first upper limit value, the second lower limit value being smaller in value than the first lower limit value.

4. An article handling system comprising:
   the X-ray inspection apparatus according to claim 3; and
   an article supply device as one of article handling apparatuses configured to supply the articles to the X-ray inspection apparatus, wherein
   the calculation unit performs control to change an article supply amount preset in the article supply device when the total amount falls outside the first predetermined range.

5. An article handling system comprising:
   the X-ray inspection apparatus according to claim 2; and
   an article supply device as one of article handling apparatuses configured to supply the articles to the X-ray inspection apparatus, wherein
   the calculation unit performs control to change an article supply amount preset in the article supply device when the total amount falls outside the first predetermined range.

6. The X-ray inspection apparatus according to claim 1, further comprising
   an inspection unit configured to inspect, based on the X-ray transmission image, whether a foreign object is contained in the articles.

7. The X-ray inspection apparatus according to claim 1, wherein
   the calculation unit is configured to calculate a total weight of the articles conveyed per predetermined time by the conveyance unit based on a brightness of each of pixels corresponding to article areas in the X-ray transmission image.

8. The X-ray inspection apparatus according to claim 7, wherein
   the calculation unit is configured to calculate a weight of a minute portion of the articles corresponding to each of the pixels by using the following formula $$m = -\alpha \ln(I/I0)$$

where m is the weight of the minute portion of the articles, $\alpha$ is a constant, I is the brightness of the pixel, and I0 is the brightness of a pixel in an area where no article exists.

* * * * *